United States Patent
Sturgin et al.

(10) Patent No.: US 10,683,901 B2
(45) Date of Patent: Jun. 16, 2020

(54) ROLLER TAILGATE CLUTCH

(71) Applicant: Schaeffler Technologies AG & Co. KG, Herzogenaurach (DE)

(72) Inventors: Todd Sturgin, Wooster, OH (US); Nicholas Hrusch, Akron, OH (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 317 days.

(21) Appl. No.: 15/797,675

(22) Filed: Oct. 30, 2017

(65) Prior Publication Data
US 2019/0128342 A1 May 2, 2019

(51) Int. Cl.
| | | |
|---|---|---|
| F16D 41/067 | (2006.01) | |
| F16D 41/10 | (2006.01) | |
| F16D 41/06 | (2006.01) | |
| F16D 41/08 | (2006.01) | |
| B62D 33/027 | (2006.01) | |
| B60J 5/10 | (2006.01) | |

(52) U.S. Cl.
CPC ......... *F16D 41/067* (2013.01); *F16D 41/105* (2013.01); *B60J 5/108* (2013.01); *B62D 33/027* (2013.01); *F16D 41/088* (2013.01); *F16D 2041/0605* (2013.01)

(58) Field of Classification Search
CPC .... F16D 41/067; F16D 41/088; F16D 41/105; F16D 15/00
USPC ...................................... 192/38, 44
See application file for complete search history.

(56) References Cited

U.S. PATENT DOCUMENTS

| | | | |
|---|---|---|---|
| 3,528,534 A | 9/1970 | Benson et al. | |
| 4,901,831 A * | 2/1990 | Ito | B62D 5/043 180/444 |
| 5,145,042 A * | 9/1992 | MacPherson | F16D 41/088 192/44 |
| 5,896,973 A | 4/1999 | Hochmuth et al. | |
| 6,474,457 B2 * | 11/2002 | Saiko | F16D 41/067 192/38 |
| 6,789,443 B1 | 9/2004 | Torii et al. | |
| 8,448,764 B2 | 5/2013 | Akiyoshi et al. | |
| 2003/0051959 A1 * | 3/2003 | Blair | B60K 23/06 192/21 |
| 2016/0131205 A1 | 5/2016 | Essenmacher | |
| 2016/0215826 A1 | 7/2016 | Reimchen | |

FOREIGN PATENT DOCUMENTS

DE 19744674 A1 4/1999

* cited by examiner

*Primary Examiner* — Richard M Lorence
(74) *Attorney, Agent, or Firm* — Volpe and Koenig, P.C.

(57) ABSTRACT

A clutch assembly is disclosed. The clutch assembly includes a rotational component including a hub configured to rotate relative to a mounted component; and a clutch configured to selectively transmit rotational input from the mounted component to the hub. The clutch includes a first ring including a first surface; a second ring including a second surface; a cage defining a plurality of pockets which are bounded by the first surface and the second surface; and a plurality of rollers each positioned in a respective one of the plurality of pockets. The first ring includes a pair of ramps in each pocket. The second ring rotates relative to the first ring when the plurality of rollers are in a neutral position between the pair of ramps, and the second ring rotates with the first ring when the plurality of rollers are positioned on either of the ramps.

12 Claims, 3 Drawing Sheets

ROLLER TAILGATE CLUTCH

FIELD OF INVENTION

The present invention relates to a clutch capable of selectively transmitting torque, and, more particularly, to a tailgate clutch having a dragging cage which provides selected torque transmission and freewheeling capabilities.

BACKGROUND

A clutch can take many forms but generally provides selective transmission of torque between an input and an output. Each clutch may be configured to only transmit torque when desired. For example, a clutch present in a manual transmission vehicle is switchable to transmit torque from an engine to an output shaft only when engaged in a gear selected by a driver. The transmission is otherwise in a neutral position in which the engine is effectively disconnected from the wheels.

In other situations, the characteristics of a clutch may be dictated by the desired behavior given foreseeable circumstances. In one example, a clutch may be used in situations where a component may be power driven by a motor or manually moved by an operator. A power-driven vehicle tailgate is one example of this situation. In particular, many trucks today include power-assist or power-driven tailgates which can be electronically moved between opened and closed positions or manually rotated by an operator. In this situation, there is a need for a clutch which allows freewheel rotation of the tailgate to allow for the manual operation in addition to locked rotation in either direction when a torque is being applied by a driving motor. In addition, when a driving torque is being applied, the clutch should allow for freewheel rotation in the direction of travel which assists the rotation and resist rotation in an opposite direction to transmit a torque back through to the motor.

Current clutch configurations do not provide all of these parameters in a small envelope which would render it usable in conjunction with a tailgate or other similar driven element. The present disclosure is directed to overcoming one or more problems of the prior art, including providing a clutch in a compact form capable of achieving all of the desired characteristics for relative rotation of an element such as a vehicle tailgate.

SUMMARY

In one aspect, the present disclosure is directed to a clutch assembly. The clutch assembly includes a rotational component including a hub configured to rotate relative to a mounted component; and a clutch configured to selectively transmit rotational input from the mounted component to the hub. The clutch includes a first ring including a first surface; a second ring including a second surface; a cage defining a plurality of pockets which are bounded by the first surface and the second surface; and a plurality of rollers each positioned in a respective one of the plurality of pockets. The first ring includes a pair of ramps in each pocket. The second ring rotates relative to the first ring when the plurality of rollers are in a neutral position between the pair of ramps, and the second ring rotates with the first ring when the plurality of rollers are positioned on either of the ramps.

In another aspect, the present disclosure is directed to a clutch. The clutch includes a first ring and a second ring. The second ring is configured to freewheel in both rotational directions when no input torque is applied, and the second ring is configured to be driven by the first ring when an input torque is provided to the first ring in either rotational direction.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENT(S)

The present disclosure relates to a clutch which rotates an output when a driving input is provided in either rotational direction and freewheels in both directions when a driving input is not applied. In addition, the output is allowed to freewheel in a direction of rotation when it is rotated faster than a driving speed. When the driven output runs into an obstruction, the clutch transmits torque back to the input. These features are provided in a compact design which utilizes a biased roller positioned by a dragging cage. The roller is initially in a neutral position, allowing for the freewheeling of the output. When an input is provided, the roller moves up a ramp in either direction, transmitting torque to the output.

Figure 1:
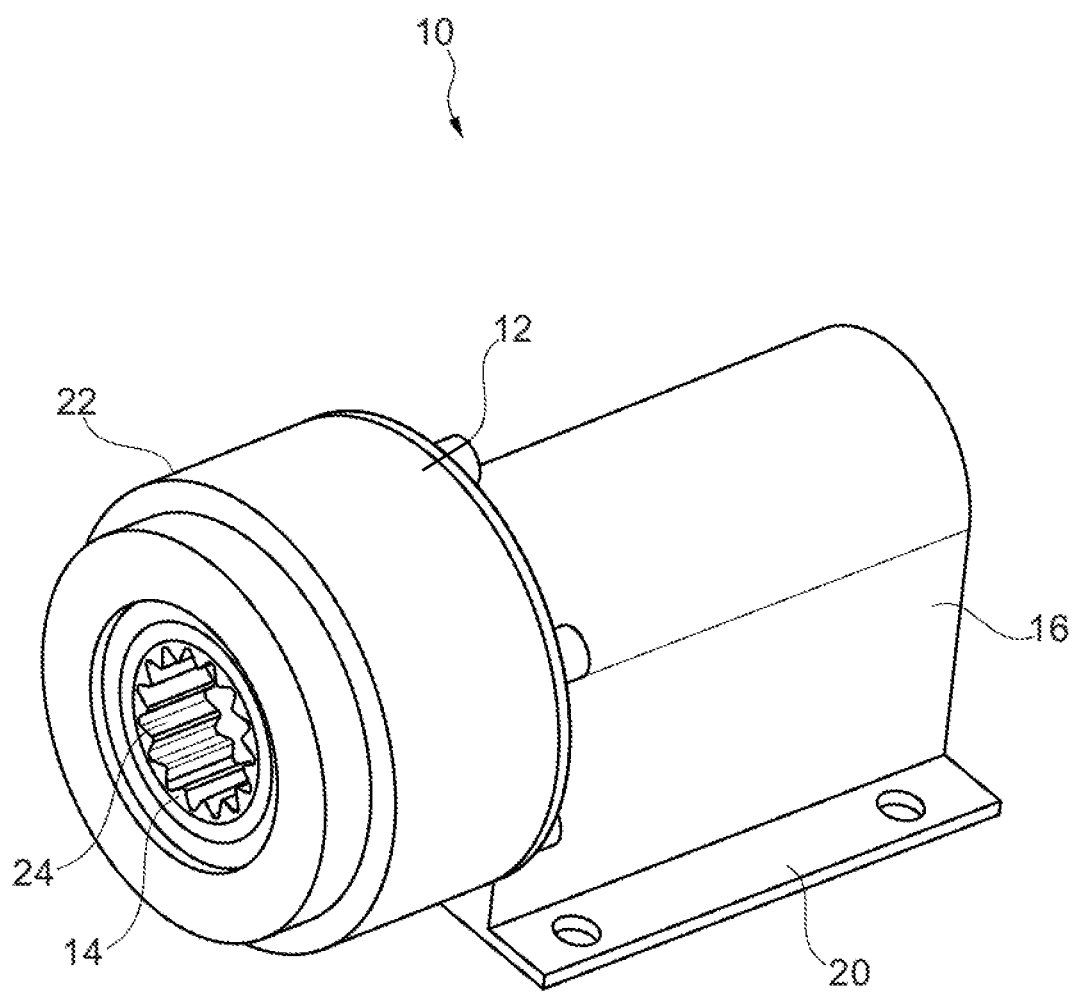
FIG. 1 is a perspective view of a clutch assembly, according to an exemplary embodiment.

FIG. 1 is a perspective view of a clutch assembly 10, according to an exemplary embodiment. The clutch assembly 10 includes a mounted component 12 and a rotational component 14. In one example, the clutch assembly 10 is used in conjunction with a vehicle tailgate. For instance, the mounted component 12 may be mounted to a stationary portion of the vehicle and the rotational component 14 is attached to the movable tailgate. Rotation of the rotational component 14 causes rotation or movement of the tailgate and vice versa.

Figure 2:
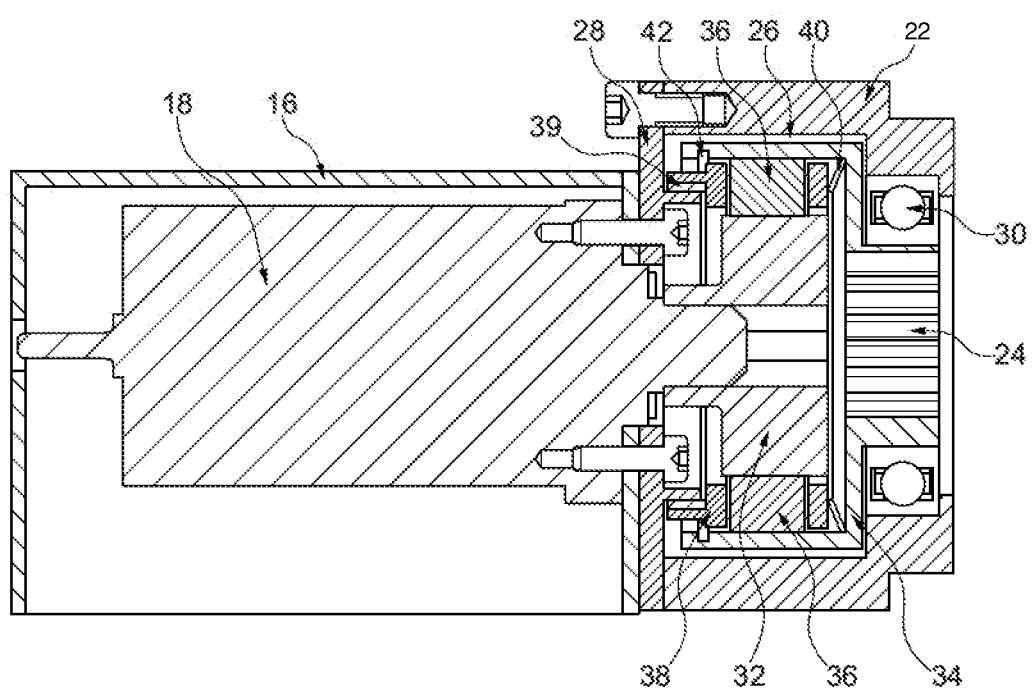
FIG. 2 is a cross-sectional view of the clutch assembly of FIG. 1, including a clutch.

In an exemplary embodiment, the mounted component 12 includes a motor housing 16 which is configured to house a motor 18 (shown in FIG. 2). The mounted component 12 may further include an attachment feature 20, such as a flange with bolt holes. The mounted component 12 is configured to be secured to a vehicle in order to mount the motor 18 in a stationary position. The motor housing 16 may also include space or channels for receiving wiring or controls for the motor 18. In an exemplary embodiment, the mounted component 12 also includes a shell component 22 which is fixed to the motor housing 16 and which covers the rotational component 14.

The rotational component 14 is preferably cylindrical and configured for rotation inside the shell component 22 via the motor 18. In an exemplary embodiment, the rotational component 14 includes a hub 24 which connects the rotational component 14 to an external device, such as a tailgate. The hub 24 is part of a clutch 26 which selectively translates rotational motion from the motor 18 to the hub 24 in order to cause rotation of the external device connected to the hub 24 under certain conditions. The hub 24 may be, for example, a ring gear having inward-facing teeth or another type of hole including a mating feature.

FIG. 2 is a cross-sectional view of the clutch assembly 10, showing the motor 18 and the clutch 26. The motor housing 16 acts as a mechanical ground for the system and is mounted with the motor 18 in a stationary position. In some embodiments, a grounded component 28 such as a flange is mounted to the motor housing 16 and the shell component 22 is mounted to the grounded component 28. The grounded component 28 may be mounted to outside of the motor housing 16 and the motor 18 by a fastener such as a bolt. The shell component 22 extends over the clutch 26 and interfaces with the rotational component 14. A bearing 30 is positioned at an end of the shell component 22 near the hub 24. The bearing 30 supports the hub 24 and centers the hub 24 to the motor 18.

The clutch 26 includes a first ring 32 and a second ring 34. The first ring 32 is fixed to an output of the motor 18 and is configured to be rotated by the motor 18 in either rotational direction. The clutch 26 is configured such that the rotation of the first ring 32 is selectively transmitted as torque to the second ring 34. A plurality of rollers 36 are positioned on the first ring 32. The rollers 36 are preferably cylindrical rollers but may have other configurations. The rollers 36 are spaced from each other and retained by a cage 38. The cage 38 drags on the grounded component 28 through a bushing 39. As used herein, the term drag requires fractional engagement between two surfaces. The cage 38 is installed onto a spring 40 which provides an axial force between the cage 38 and the second ring 34. The spring 40 between the cage 38 and the second ring 34 provides a relatively small axial force to help resist the second ring 34 slipping under quick changes of direction. At least a portion of the second ring 34 is positioned radially outward of the roller 36 and is axially retained by a snap ring 42 which connects to the cage 38.

In an exemplary embodiment, the second ring 34 includes a first portion which covers the first ring 32 and rollers 36, and a second portion which extends axially outward and forms the hub 24. The first portion and the second portion may be integrally connected or formed separately and attached. In one example, the second ring 34 may include a two-tiered shape including a larger outer diameter in proximity to the rollers 36 and a smaller outer diameter near the hub 24. This allows for a compact construction in which rotation of the second ring 34 is directly transmitted to an external device, such as a tailgate.

Figure 3A:
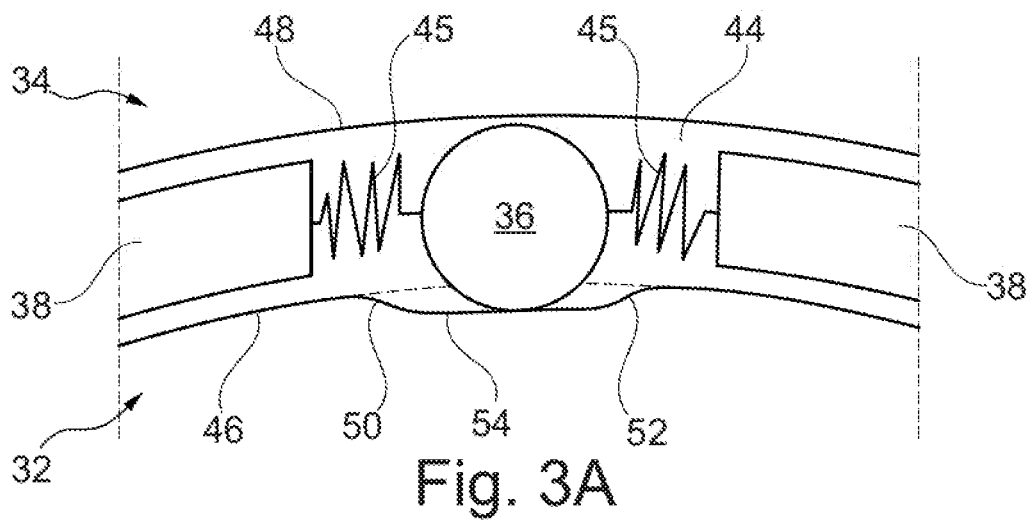
FIG. 3A is an axial side view of a portion of the clutch of FIG. 2 in a neutral position.
Figure 3B:
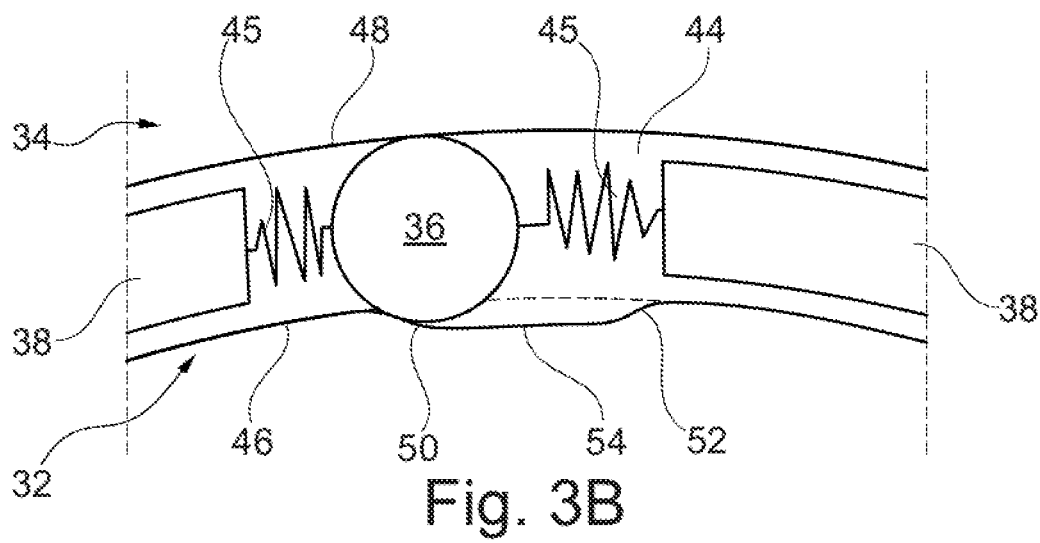
FIG. 3B is an axial side view of the portion of the clutch in a first locked position.
Figure 3C:
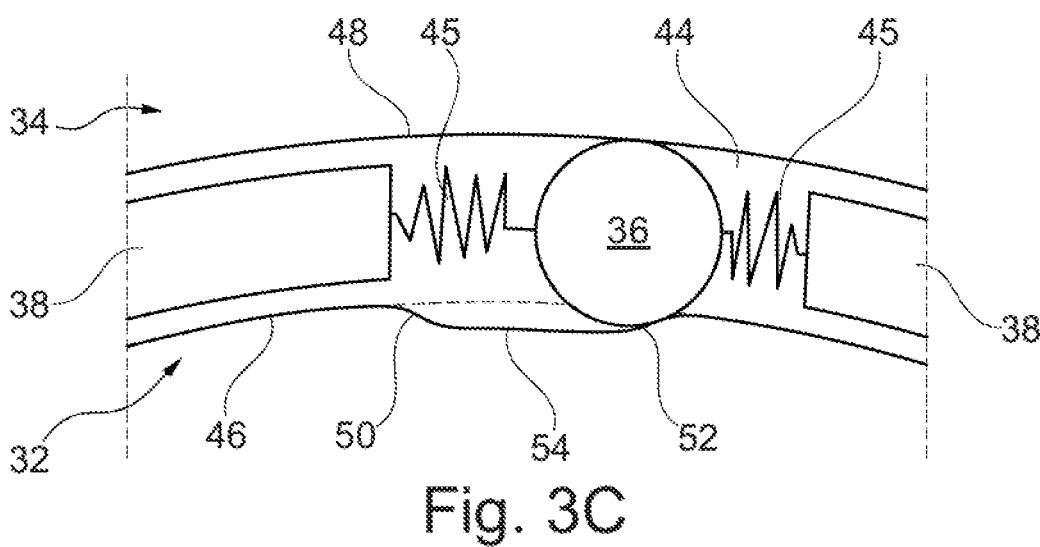
FIG. 3C is an axial side view of the portion of the clutch in a second locked position.

FIGS. 3A-3C illustrate an axial view of a portion of the clutch 26 in the area of one of the rollers 36. The roller 36 is positioned in a pocket 44 defined by the cage 38. The roller 36 is held in the center of the pocket 44 by a pair of springs 45 attached at opposite ends to sides of the cage 38 which form the pocket 44. The first ring 32 includes a first surface 46 and the second ring 34 includes a second surface 48 which bound the pocket 44 and the roller 36 radially.

The first surface 46 includes a first ramp 50 and a second ramp 52 which extend upwardly in opposite directions away from a center portion 54 of the pocket 44. As shown in FIG. 3B, rotation of the first ring 32 in a clockwise direction would move the roller 36 up the first ramp 50. FIG. 3C shows that rotation of the first ring 32 in a counterclockwise direction would move the roller 36 up the second ramp 52.

The clutch 26 is in a neutral position when the roller 36 is in the position of FIG. 3A. In this position, the second ring 34 is able to freewheel in relation to the first ring 32. In particular, the roller 36 remains on the center portion 54 of the first surface 46 and the first portion of the second ring 34 is able to rotate freely in either direction without being impeded by the roller 36. In an exemplary embodiment, this configuration allows an operator to manually rotate an external device, such as a tailgate of a vehicle without resistance from the clutch 26.

The clutch 26 is in a locked position when the roller 36 is in the position of FIG. 3B or FIG. 3C. These positions result when the first ring 32 is rotated by the motor 18 to produce an input torque which forces the roller 36 up one of the ramps 50 or 52, depending on the direction of rotation. In either case, the roller 36 has a diameter such that it contacts the second surface 48 of the second ring 34 and creates a frictional connection which transmits the rotation of the first ring 32 to the second ring 34. In this way, an output of the motor 18 is translated into rotation of the second ring 34 and thus the hub 24 and the connected external device such as a tailgate. Through this configuration, the tailgate or other device is able to be freely rotated for manual operation and electronically driven by a motor.

The configuration also produces desired results in other possible input situations. These situations may occur when a manual input is applied at the same time as an electronic input from the motor 18. For example, if the second ring 34 is manually driven faster than it is being electronically driven by the motor 18 (i.e., an operator opens the tailgate while is being electronically opened), the second ring 34 moves relative to the roller 36 until the roller 36 is again in the neutral position shown in FIG. 3A and the second ring 34 is allowed to freewheel based on the operator input. Conversely, if a torque is applied in a direction opposite from the direction of rotation of the motor 18 and first ring 32, the second ring 34 is not allowed to freewheel and instead the torque is applied back to the motor 18. For example, while the first ring 32 is driving the second ring 34 in either direction, if the second ring 34 is slowed down or stopped relative to the first ring 32, the roller 36 remains in the locked position and the torque is transmitted back to the motor 18, which can enter increase, decrease, stop, or reverse the direction of the input torque accordingly.

As described above, the disclosed clutch assembly provides flexibility to account for various rotational input scenarios which may occur. The disclosed clutch assembly and associated clutch are particularly applicable to use with a tailgate or other trunk or hatch device because it allows for manual or electronic operation and overrides the electronic operation when manual input is provided. In addition, this functionality is provided in a compact form, which is suitable for a vehicle environment where additional bulk and weight is undesirable. It should be understood, however, that the disclosed clutch assembly and clutch may be applied to other systems and devices for control of rotation.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

COMPONENT LIST

10. Clutch Assembly
12. Mounted Component
14. Rotational Component
16. Motor Housing
18. Motor
20. Attachment Feature
22. Shell Component
24. Hub
26. Clutch
28. Grounded Component
30. Bearing
32. First Ring
34. Second Ring
36. Roller
38. Cage
39. Bushing
40. Spring
42. Snap Ring
44. Pocket
45. Spring
46. First Surface
48. Second Surface
50. First Ramp
52. Second Ramp
54. Center Portion

What is claimed is:

1. A clutch assembly, comprising:
a rotational component including a hub configured to rotate relative to a mounted component; and
a clutch configured to selectively transmit rotational input from a motor arranged within the mounted component to the hub, the clutch comprising:
a first ring adapted to engage an output of the motor, the first ring including a first surface;
a second ring including a first end covering the first ring and a second end adapted to engage the hub, the second ring including a second surface;
a cage defining a plurality of pockets which are bounded by the first surface and the second surface;
a plurality of rollers each positioned in a respective one of the plurality of pockets; and
a snap ring adapted to axially retain the second ring via a free end defined on the first end of the second ring;
wherein the first ring includes a pair of ramps in each pocket, and
wherein the second ring rotates relative to the first ring when the plurality of rollers are in a neutral position between the pair of ramps, and the second ring rotates with the first ring when the plurality of rollers are positioned on either of the ramps.

2. The clutch assembly of claim 1, further comprising a shell that covers the rotational component.

3. The clutch assembly of claim 2, further comprising a bearing between the shell and the hub which supports the hub.

4. The clutch assembly of claim 3, wherein the hub and the second ring are integrally formed as one piece.

5. The clutch assembly of claim 1, wherein the second ring includes a first portion having a larger diameter than a second portion.

6. The clutch assembly of claim 5, wherein the first portion includes the second surface and the second portion includes the hub.

7. The clutch assembly of claim 1, wherein the cage frictionally engages a bushing connected to the mounted component.

8. The clutch assembly of claim 1, wherein each roller is centered in the respective pocket by a pair of springs attached to the cage.

9. A clutch assembly, comprising:
a rotational component including a hub configured to rotate relative to a mounted component; and
a clutch configured to selectively transmit rotational input from a motor arranged within the mounted component to the hub, the clutch comprising:
a first ring adapted to engage an output of the motor, the first ring including a first surface;
a second ring adapted to engage the hub, the second ring including a second surface;
a cage defining a plurality of pockets which are bounded by the first surface and the second surface; and
a plurality of rollers each positioned in a respective one of the plurality of pockets,
the first ring includes a pair of ramps in each pocket, and
the second ring rotates relative to the first ring when the plurality of rollers are in a neutral position between the pair of ramps, and the second ring rotates with the first ring when the plurality of rollers are positioned on either of the ramps, and
wherein a spring provides an axial force between the cage and the second ring.

10. The clutch assembly of claim 9, wherein the second ring is retained against the force of the spring by a snap ring.

11. The clutch assembly of claim 1, wherein the second ring is configured to freely rotate when a torque is applied to the second ring in a direction of an input torque applied to the first ring.

12. The clutch assembly of claim 1, wherein the second ring is locked relative to the first ring when a torque is applied to the second ring in a direction opposite to an input torque applied to the first ring.

* * * * *